(12) United States Patent
Caze et al.

(10) Patent No.: US 7,591,947 B2
(45) Date of Patent: Sep. 22, 2009

(54) POROUS MEMBRANE MICROSTRUCTURE DEVICES AND METHODS OF MANUFACTURE

(75) Inventors: Philippe Caze, Fontainebleau (FR); Celine Claude Guermeur, Chartrettes (FR); Didier H Letourneur, Lyons (FR); Jean-Pierre Themont, Montigny sur Loing (FR); Jean Waku Nsimba, Avon (FR); Pierre Woehl, Cesson (FR)

(73) Assignee: Corning Incorporated, Corning, NY (US)

( * ) Notice: Subject to any disclaimer, the term of this patent is extended or adjusted under 35 U.S.C. 154(b) by 15 days.

(21) Appl. No.: 11/016,645

(22) Filed: Dec. 17, 2004

(65) Prior Publication Data
US 2005/0167354 A1 Aug. 4, 2005

(30) Foreign Application Priority Data
Dec. 24, 2003 (EP) ................... 03293330

(51) Int. Cl.
*B01D 63/08* (2006.01)
*B01D 69/06* (2006.01)
*B01D 69/10* (2006.01)
*B01D 67/00* (2006.01)
*B01D 61/00* (2006.01)

(52) U.S. Cl. .............. 210/510.1; 210/321.75; 210/321.84; 210/498; 210/504

(58) Field of Classification Search ........................ None
See application file for complete search history.

(56) References Cited

U.S. PATENT DOCUMENTS

| 5,853,446 A | 12/1998 | Carre et al. ................... 65/17.3 |
| 6,036,927 A | 3/2000 | Chatterjee et al. ........... 422/211 |
| 6,129,973 A | 10/2000 | Martin et al. ................ 428/166 |
| 6,595,232 B2 | 7/2003 | Guzman et al. .......... 137/15.01 |

FOREIGN PATENT DOCUMENTS

| DE | 1792446 | * | 4/1971 |
| DE | 19910392 | | 9/2000 |
| EP | 1329258 | | 7/2003 |
| WO | WO95/29751 | | 11/1995 |
| WO | WO 0047307 A1 | * | 8/2000 |
| WO | WO01/68257 | | 9/2001 |
| WO | WO03/015890 | | 2/2003 |

OTHER PUBLICATIONS

IUPAC Manual of Symbols and Terminology, Appendix 2, Part 1; Colloid and Surface Chemistry; Pure Applied Chemisty; vol. 31, No. 4; pp. 578-638; 1972.
Perez et al.; "Preparation and Characterisation of a Pt/Ceramic Catalytic Membrane"; Separation and Purification Technology; 25 (2001) 33-38.
Casanave et al.; "Control of Transport Properties with a Microporous Membrane Reactor to Enhance Yields in Dehydrogenation Reactions"; Catalysis Today; 25 (1995) 309-314.
Mota et al; "Membrane Reactor for Selective Oxidation of Butane to Maleic Anhydride"; Catalysis Today; 67 (2001) 169-176.

* cited by examiner

*Primary Examiner*—Krishnan S Menon
(74) *Attorney, Agent, or Firm*—Gregory V. Benn

(57) ABSTRACT

A membrane microstructure device is disclosed. The membrane microstructure device includes a first glass, ceramic or glass-ceramic plate defining a first recess, a second glass, ceramic or glass-ceramic plate defining a second recess, and a non-metallic porous membrane sandwiched between the first and second plates. The first plate, second plate and porous membrane are joined together and the porous membrane is arranged to cover the first and second recesses to define a first microchannel between the first plate and the porous membrane and a second microchannel in fluid communication with the first microchannel between the second plate and the porous membrane. A method of manufacturing a membrane microstructure device is also disclosed.

13 Claims, 7 Drawing Sheets

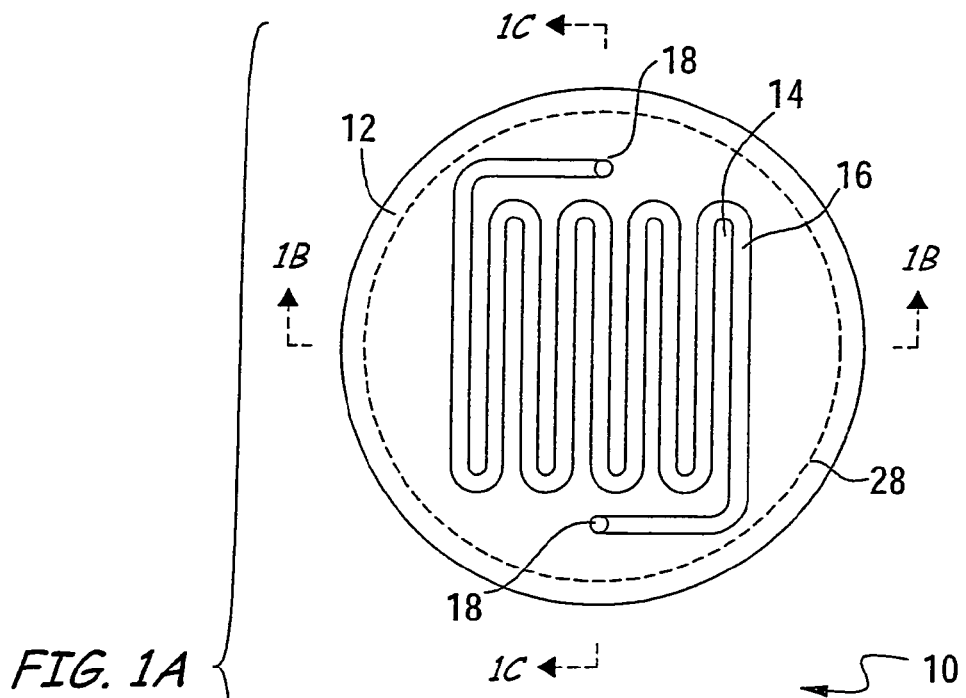
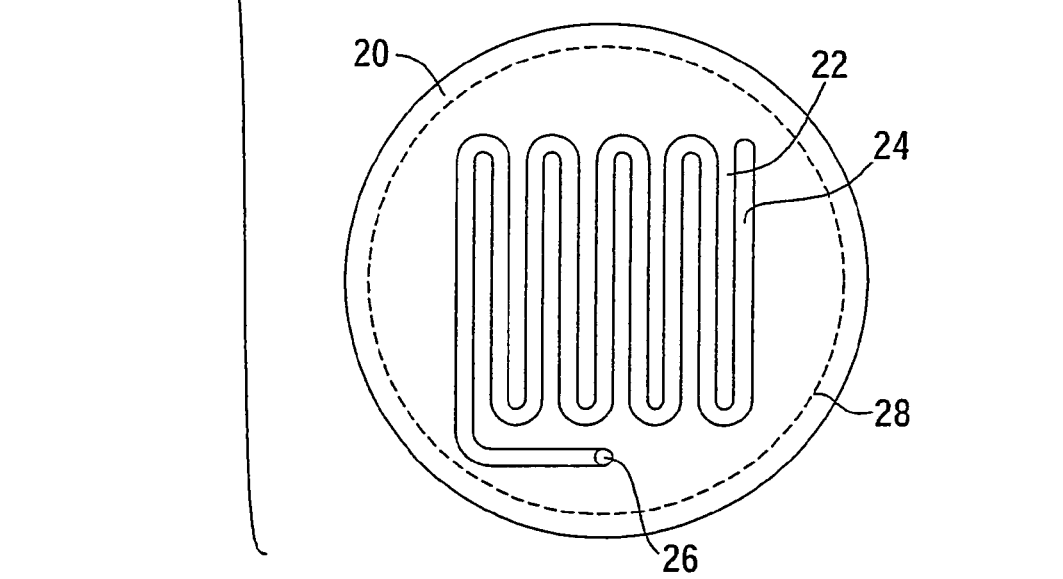
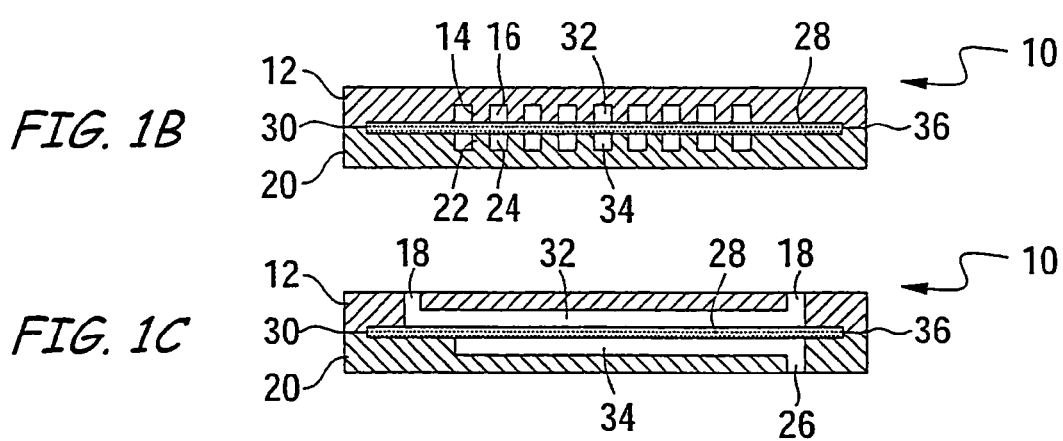
FIG. 1A
FIG. 1B
FIG. 1C

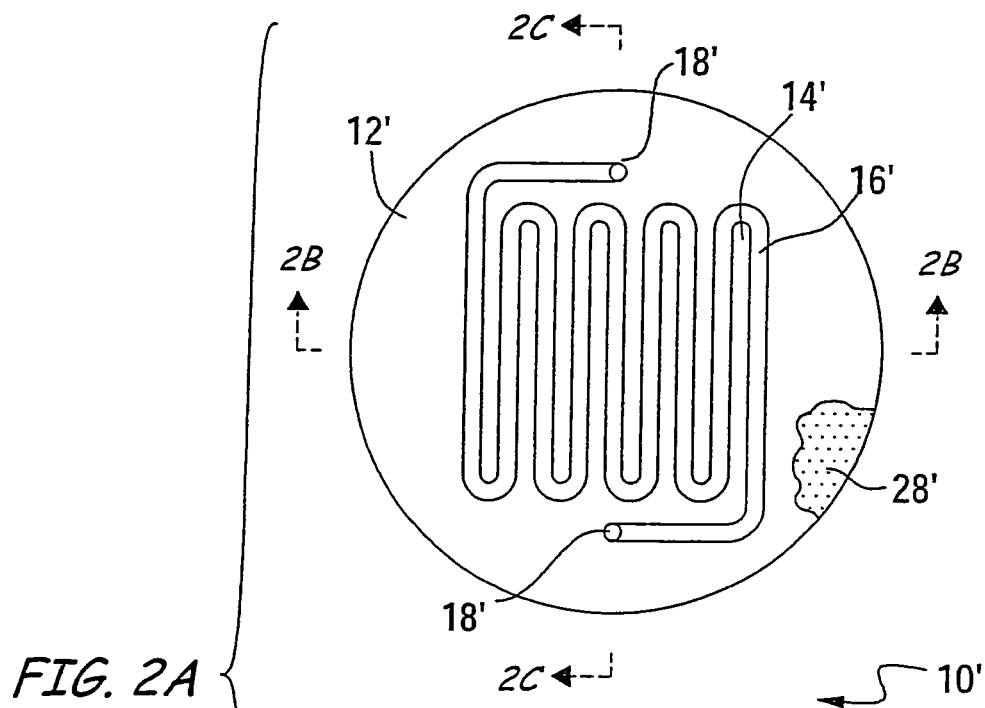
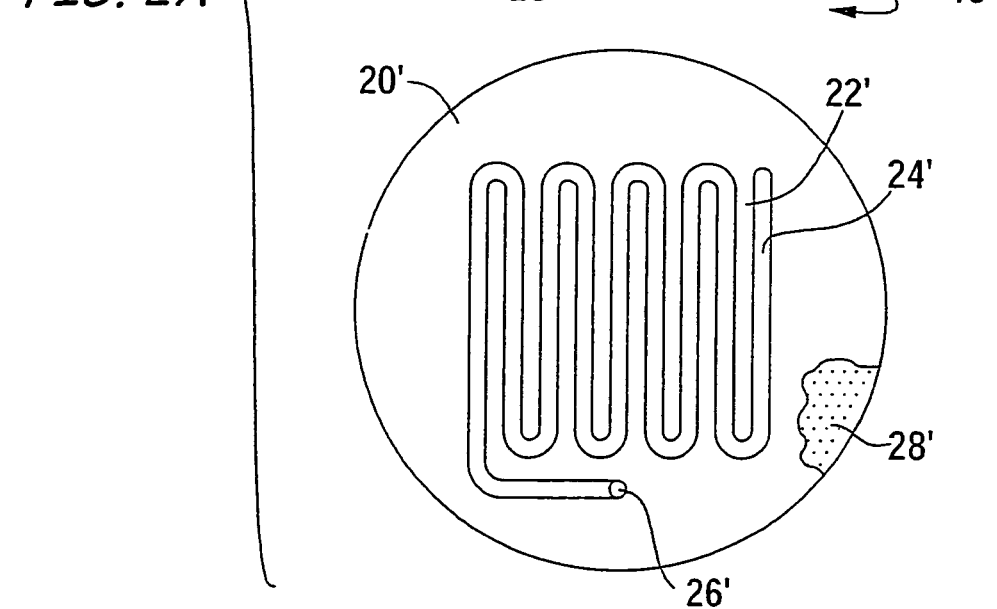
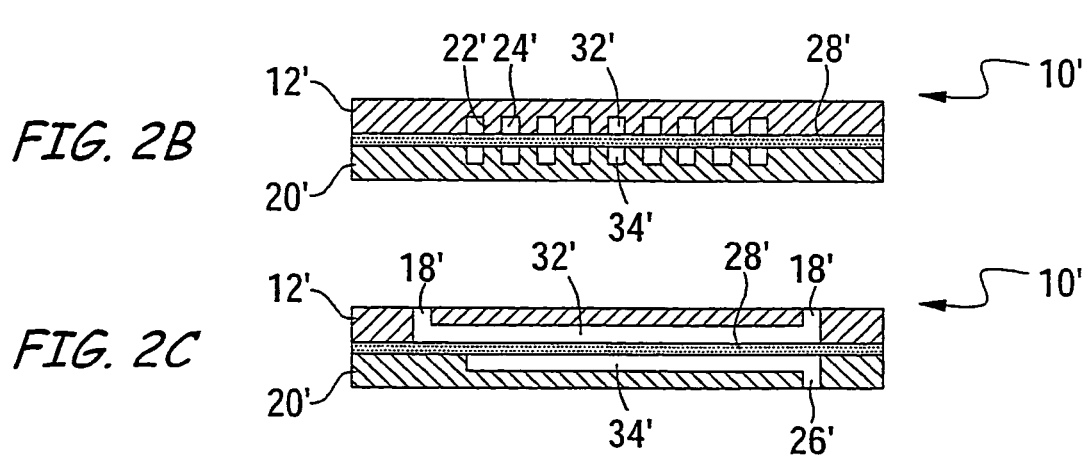
FIG. 2A
FIG. 2B
FIG. 2C

US 7,591,947 B2

POROUS MEMBRANE MICROSTRUCTURE DEVICES AND METHODS OF MANUFACTURE

BACKGROUND

1. Field of the Invention

The present invention relates generally to the field of microstructure devices, and more particularly to a microstructure device incorporating a porous membrane.

While the present invention is subject to a wide range of applications, it is particularly well suited for extractor, separator, diffuser, and contactor applications in the field of microfluidic reactor systems.

2. Technical Background

Reactor systems incorporating porous membranes, known generally as membrane reactors, have typically been used to achieve separation of multi-phase complex feeds, or to filter a single phase. Generally speaking, the porous membrane within conventional membrane reactors may exhibit micro-to-macro porosity, and may be fabricated from a number of materials. Porous materials are commonly categorized according to their (average) pore size. Microporous materials generally have pore diameters less than or equal to 10 nanometers (nm), mesoporous materials typically have pores in the range of about 2.0 to 50.0 nm and macroporous materials typically contain pores as large as about 250 nm. See, IUPAC Manual of Symbols and Terminology, Appendix 2, Part 1, Colloid and Surface Chemistry, *Pure Appl. Chem.* 31, 578 (1972). Depending upon, among other factors, the average pore size, certain porous membranes may serve as a support structure for a catalytic material, if required by a particular application.

Porous membranes used in membrane reactors are now generally classified based on the role or function of the membrane in a given reactor. Conventionally, porous membranes within membrane reactors may be classified by one of three functions. If the function of the membrane is principally to selectively remove, from the reactor, a product of an equilibrium-restricted reaction, in order to gain yield on conventional reactors, or to remove one or several components within a complex mixture, the membrane reactor is typically classified as an, "extractor." In other applications, the role of the membrane is to dose a reactant that may originate successive reactions. As the targeted product is often a product of primary addition, the regulation of this reactant concentration by permeation through the membrane may improve the selectivity. When compared to a conventional reactor, the same amounts of reactants may be introduced, but here, one of them is distributed by the membrane along a catalyst bed. This type of membrane reactor is thus typically termed a, "distributor" or a "diffuser." The third type of membrane reactor generally takes advantage of the unique geometry of the membrane, e.g., a permeable wall separating two media. When the membrane is also a support for a catalyst, it is possible to feed the membrane from both sides with reactants (for instance gas from one side, liquid from the other) or to force a reactive mixture through the reactive wall. In the first case, it is possible to favour the contact between the catalyst and the reactant that is limiting the performance in conventional reactors (e.g., gas in gas-liquid-solid processes, hydrophobic reactant with hydrophilic catalyst, etc.). In the second case, the residence time in the active pore of reactants and products is controlled by operating parameters (pressure drop across the membrane) and not by diffusion. This may lead to better control of activity or selectivity. In the two cases, the role of the membrane is to favour contact between reactants and the catalyst. Such a membrane reactor is generally known as a "contactor." More specifically, the first contactor mode described above being termed an "interfacial contactor," and the second mode being termed a "flow-through contactor."

Typical membrane reactors utilized in the art are constructed of concentric tubes (the membrane being the inner tube). One specific tube-type membrane reactor is known as a packed bed membrane reactor (PBMR). Such a membrane reactor combines a tubular porous ceramic membrane and a fixed bed catalyst placed in the core volume of the ceramic tube. The membrane reactor module is typically made of a stainless steel shell containing the composite membrane tube, which is packed with the catalyst. Generally speaking, the ends of the membrane tube are enameled and equipped with compression fittings such as graphite seals in order to ensure tightness between the inner (retentate or tube side) and the outer (permeate or shell side) compartments. In such a conventional tube-type membrane reactor, fluids are simply delivered to the reactor at one end of the tube, while the other end of the reactor serves as an outlet port. As one of skill in the art readily recognizes, industrialization and parallelization of such tube-type reactors is complicated and difficult to implement. Moreover, control of the reaction requires complex fluid management outside of the reactor, particularly upstream of the inlet port or ports. In addition to these shortcomings the structure of tube-type membrane reactors provides poor mechanical support for the catalyst material(s), and is not easily sealed. Accordingly, leakage from such devices is generally the norm, which significantly adversely effects efficiency.

With the advent of microreactor technology, attempts have recently been made to reduce the scale of membrane reactors, and thus minimize the sealing and leakage shortcomings discussed above. In connection with one microreactor approach, a porous membrane is supported about its periphery with a metal frame to form one of many laminate layers within the microreactor. The porous membrane is typically a micromachined metal layer, such as stainless steel or copper, but materials such as plastics and ceramics have been the subject of experimentation. The microlamination processing techniques and other techniques necessary to manufacture such porous layers is generally cost prohibitive for mass production, and porous membranes manufactured by these techniques have been found to have limited application for chemical processing.

What is needed therefore, but seemingly unavailable in the art, is a microstructure device incorporating a porous membrane and method of manufacturing such a microstructure device that overcomes shortcomings associated with membrane microreactors known in the art.

SUMMARY

One aspect of the present invention relates to integral microstructures. One such microstructure includes a first plate having a first plurality of walls defining a first recess, a second plate having a second plurality of walls defining a second recess and a glass, ceramic or glass-ceramic porous membrane disposed between the first and second plates. The first plate, second plate and porous membrane are joined together such that the porous membrane cooperates with the first and second plurality of walls to define a first microchannel and a second microchannel in fluid communication with the second microchannel.

Another such microstructure includes a first glass, ceramic or glass-ceramic plate defining a first recess, a second glass, ceramic or glass-ceramic plate defining a second recess, and a non-metallic porous membrane sandwiched between the first and second plates. The first plate, second plate and porous membrane are joined together and the porous membrane is arranged to cover the first and second recesses to define a first microchannel between the first plate and the porous membrane and a second microchannel in fluid communication with the first microchannel between the second plate and the porous membrane.

An additional aspect of the present invention is directed to methods of manufacturing a microstructure. One exemplary method includes disposing a precursor material atop a first plate having a first plurality of walls defining a first recess, and assembling the first plate with a second plate having a second plurality of walls defining a second recess such that the precursor material is positioned between the first and second plates and covers at least a portion of the first and second recesses. The assembled first and second plates are heated to a temperature sufficient to transform the precursor material into a glass, ceramic or glass-ceramic porous membrane joined to the first and second plates.

The disclosed membrane microstructure devices and methods of manufacturing a membrane microstructure device result in a number of advantages over other microstructure devices and manufacturing techniques known in the art. For example, the unitary construction of the disclosed porous membrane microstructure device provides significant mechanical support for the porous membrane heretofore unrealized in the art. In addition, such construction enables substantially leak-free catalytic and non-catalytic chemical processing within the membrane microstructure.

In addition, the disclosed membrane microstructure device is applicable for use in extractor, diffuser and contactor applications. By way of example, but not limitation, the membrane microstructure may be employed for $H_2$/hydrocarbon separations, methane steam reforming, alkane selective oxidation, liquid phase hydrogenation and oxidation, hydrogen production, removal of a contaminant by absorption in zeolithes, separation of volatile organic compounds from water, and energy production by using a protonic membrane (microfuel cells).

Still further advantages are obtained from the micro-scale internal dimensions of the microchannels defined within the disclosed membrane microstructure device. Generally speaking, the micro-scale microchannel dimensions provide high surface-to-volume ratios, which in turn, maximizes fluid interaction with the porous membrane. In those cases where the porous membrane is impregnated with or otherwise supports one or more catalysts, fluid/catalyst(s) contact via the porous membrane is maximized. As a result, increased productivity or yield is realized.

Additional features and advantages of the disclosed microstructures and methods will be set forth in the detailed description which follows and in part will be readily apparent to those skilled in the art from that description or recognized by practicing embodiments of the invention as described herein.

It is to be understood that both the foregoing general description and the following detailed description are merely examples, and are intended to provide an overview or framework for understanding the nature and character of the invention as it is claimed. The accompanying drawings are included to provide further understanding of the disclosed microstructures and methods of manufacture, illustrate various embodiments of the invention, and together with the description serve to explain the principles and operation of the disclosed microstructures and methods.

BRIEF DESCRIPTION OF THE DRAWINGS

FIGS. 1A-1C depict various views of a first exemplary membrane microstructure.

FIGS. 2A-2C depict various views of a second exemplary membrane microstructure.

DETAILED DESCRIPTION OF THE PREFERRED EMBODIMENTS

Figure 3:
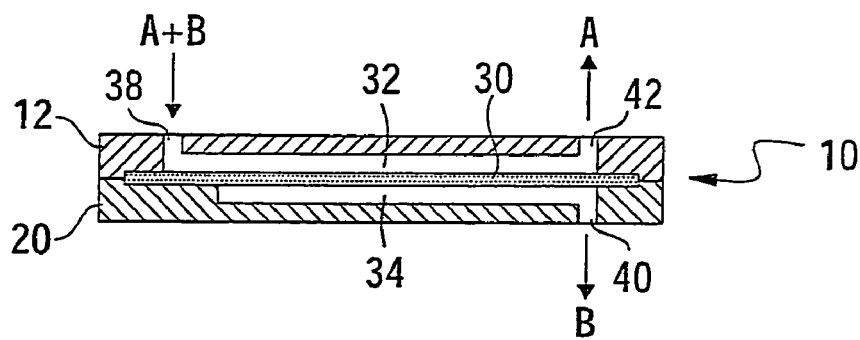
FIG. 3 depicts the membrane microstructure depicted in FIG. 1C functioning as a separator.

The disclosed porous membrane microstructure device may be applicable for use in separator, extractor, diffuser, and contactor applications. The lack of traditional microlamination process steps during its manufacture provides significant cost savings during the manufacturing process. The unitary construction of the disclosed porous membrane microstructure, among other things, provides ample mechanical support for the porous membrane and substantially eliminates leakage during chemical processing. The disclosed method of manufacturing the porous membrane microstructure is compatible with low cost production, facilitates parallelization, and results in a device that provides advantageous yields.

The present invention is broadly directed membrane microstructures and methods of their manufacture. Such a membrane microstructure is particularly well suited for chemical processing applications, and may be configured to facilitate catalytic reactions within the membrane microstructure. If the membrane in the microstructure is organic, the membrane is easy to functionalize, depending on the application of the microstructure. While such a membrane microstructure is operative as a single unitary device, a plurality of membrane microstructures may be stacked or otherwise arranged in order to, among other things, increase yields, fluid throughput through the membrane microstructure, and thus the volume of chemical processed.

Additionally, the membrane microstructure can be combined with other functionalities (e.g., heat exchanger or mixer) for ease of integration. The membrane microstructure may include a support structure for retaining the various components of the membrane microstructure, and may also include integration with, for example, various flow control components, mixing devices, thermal controls, sensing units, separation chambers, analyzing chambers, monitoring chambers, other types of reaction chambers, and any other components or devices associated with microfluidic chemical processing apparatus and systems.

A particular component may be, for example, disposed on both sides of the membrane in the microstructure, with the distance between the heat exchanger and the membrane being approximately 1 centimeter (cm). By way of additional example, a mixer may be integrated with the membrane microstructure, with the distance between the mixer and the membrane being approximately 0 to 1 cm. In another example, the distance between the mixer and the membrane is about 2 millimeters (mm). In another example, a flow controller may be integrated with the membrane microstructure. The flow controller may control the rate of flow, for example, from about 0.01 to 100 milliliters per minute (ml/min). For example, the typical time for constituents to flow between one functional component (e.g., heater or mixer) and the membrane is less than 1 minute. In another example, the mean residence time thus described could be less than 10 milliseconds (ms).

Reference will now be made in detail to embodiments of the present invention, examples of which are illustrated in the accompanying drawing figures. Wherever possible, the same reference numerals will be used throughout the drawing figures to refer to the same or like parts. An exemplary embodiment of the disclosed membrane microstructure is shown in FIGS. 1A-1C and is designated generally throughout by reference numeral 10.

FIG. 1A depicts a first exemplary unassembled membrane microstructure 10. The membrane microstructure 10 may include a first plate 12, preferably made of glass, ceramic, or glass-ceramic, having a plurality of walls 14, which together define at least one recess 16. Inlet/outlet openings 18, in one example, extend through the first plate 12 and blindly communicate with the at least one recess 16. The membrane microstructure 10 in one example further includes a second plate 20 having a second plurality of walls 22, which together define at least one recess 24. The second plate 20 may include at least one inlet/outlet opening 26 in communication with the at least one recess 24. A precursor material layer 28 may be disposed atop one or both of the first plate 12 and the second plate 20. Precursor material layer 28 may cover at least a portion of the one or more recesses 16 and 24 and is supported, at least in part, by the plurality of walls 14 and 22. As will be described in greater detail below, the precursor material layer 28, in one example, forms the disclosed porous membrane following hardening.

FIG. 1B depicts a first membrane microstructure 10 following assembly of the plates 12 and 20 depicted in FIG. 1A. FIG. 1B depicts a cross-sectional view of the membrane microstructure 10 taken along a line passing through the plurality of recesses 16 and 18. Following sufficient heat treatment (as will be described below with reference to the disclosed method of manufacturing), the membrane microstructure 10 is a unitary device in one example, including the first plate 12, the second plate 20, and the porous membrane 30 sandwiched therebetween. As will be described in greater detail below, the porous membrane 30 may result from a sufficient heat treatment of precursor material layer(s) 28, which in one embodiment may be a glass, ceramic, or glass-ceramic frit. Together, the porous membrane 30, the plurality of walls 14, and the first plate 12 define at least one microchannel 32, while the porous membrane 30, the second plurality of walls 22 and the second plate 20 define at least one microchannel 34. Microchannel(s) 32 and microchannel(s) 34 provide fluid flow paths for one or more chemicals to be processed within the membrane microstructure 10. Among other things, the porosity of the porous membrane 30 provides selective fluid communication between microchannel(s) 32 and microchannel(s) 34. While the plurality of walls 14 and 22, and the recesses 16 and 24, are shown in FIG. 1B to be perfectly aligned, the walls 14, 22 and the recesses 16, 24 may be off-set from each other in, for example, size, width, and/or angle.

FIG. 1C depicts a cross-sectional view of the membrane microstructure 10 taken through inlet/outlet openings 18 and 26 and along the length of the microchannel 32 and the microchannel 34. In accordance with one embodiment, the first plate 12, the second plate 20 and the porous membrane 30 are sealed together in a fluid-tight manner. Fluid communication between microchannels 32 and 34 and the outside of the membrane microstructure 10 may be provided by inlet/outlet openings 18 and 26, which may serve as inlets or outlets for chemicals or other fluids passed into or out of the membrane microstructure 10 as will be described in greater detail below. Generally speaking, inlet/outlet openings 18 and 26 may be connected to conduits or other devices (not shown) in order to facilitate the transport of chemicals or other fluids into and/or out of the membrane microstructure 10. In other embodiments, inlet/outlet openings 18 and 26 may be substantially aligned with inlet/outlet openings 18 and 26 of other membrane microstructures 10 or other microstructure devices in order to facilitate parallelization. In one embodiment, one or more membrane microstructures 10 may be stacked, for example, one atop the other or in parallel with other microstructure devices to form an array of stacked plate microstructures. Generally speaking, such an arrangement may provide for higher fluid flow volumes, and thus, greater yields.

As shown clearly in FIGS. 1B and 1C, and in accordance with an embodiment, the porous membrane 30 may preferably be completely encapsulated within the membrane microstructure 10. As depicted in the figures, the first plate 12 and the second plate 20 may be sealed to one another at a plate interface 36 extending along the periphery of the membrane microstructure 10. Thus, although the first plate 12 and the second plate 20 may be manufactured from different materials, the plates 12 and 20 may be compatible with respect to the bonding techniques utilized to join the first plate 12 and the second plate 20.

FIG. 2A depicts a second exemplary unassembled-membrane microstructure 10'. The membrane microstructure 10' preferably includes a first plate 12', preferably made of glass, ceramic, or glass-ceramic, having a plurality of walls 14', which together define at least one recess 16'. Inlet/outlet openings 18' preferably extend through the first plate 12' and communicate with the at least one recess 16'. The membrane microstructure 10' further may include a second plate 20' having a second plurality of walls 22', which together define at least one recess 24'. The second plate 20' may include at least one inlet/outlet opening 26' in communication with the at least one recess 24'. A precursor material layer 28' may be disposed atop one or both of the first plate 12' and the second plate 20'. The precursor material layer 28' may cover at least a portion of the one or more recesses 16' and 24' and is supported, at least in part, by the plurality of walls 14' and 22'. As will be described in greater detail below, the precursor material layer 28' may form the disclosed porous membrane following hardening in accordance with the disclosed manufacturing method.

FIG. 2B depicts a second preferred membrane microstructure 10' following assembly of plates 12' and 20' depicted in FIG. 2A. FIG. 2B depicts a cross-sectional view of the membrane microstructure 10' taken along a line passing through the plurality of recesses 16' and 18'. Following sufficient heat treatment (as will be described below with reference to the disclosed method of manufacturing) the membrane microstructure 10' in one example a unitary device including the first plate 12', the second plate 20', and the porous membrane 30' sandwiched therebetween. As will be described in greater detail below, the porous membrane 30' may result from a sufficient heat treatment of precursor material layer(s) 28', which in one embodiment, may be a glass, ceramic, or glass-ceramic frit. Together, the porous membrane 30', plurality of walls 14', and the first plate 12' define at least one microchannel 32', while the porous membrane 30', the second plurality of walls 22' and the second plate 20' define at least one microchannel 34'. The microchannel(s) 32' and microchannel(s) 34' provide fluid flow paths for one or more chemicals to be processed within the membrane microstructure 10'. Among other things, the porosity of the porous membrane 30' provides selective fluid communication between microchannel(s) 32' and microchannel(s) 34'.

FIG. 2C depicts a cross-sectional view of the membrane microstructure 10' taken through inlet/outlet openings 18' and 26' and along the length of the microchannel 32' and the microchannel 34'. In accordance with a second embodiment, the first plate 12', the second plate 20', and the porous membrane 30' are sealed together in a fluid-tight manner. Fluid communication between microchannels 32' and 34' and the outside of the membrane microstructure 10' may be provided by inlet/outlet openings 18' and 26', which may serve as inlets or outlets for chemicals or other fluids passed into or out of the membrane microstructure 10' as will be described in greater detail below. Generally speaking, inlet/outlet openings 18' and 26' may be connected to conduits or other devices (not shown) in order to facilitate the transport of chemicals or other fluids into and/or out of the membrane microstructure 10'. In other embodiments, inlet/outlet openings 18' and 26' may be substantially aligned with inlet/outlet openings 18' and 26' of other membrane microstructures 10' or other microstructure devices in order to facilitate parallelization. In one embodiment, one or more membrane microstructures 10' may be stacked, for example, one atop the other or in parallel with other microstructure devices to form an array of stacked plate microstructures. Generally speaking, such an arrangement may provide for higher fluid flow volumes, and thus, greater yields.

As shown clearly in FIGS. 2B and 2C, and in accordance with a second embodiment, the porous membrane 30' may extend across the entire central portion of the membrane microstructure 10'. As depicted in the figures, the first plate 12' and second plate 20' may each be joined to the porous membrane 30' to form a unitary membrane microstructure 10'. Thus, although the first plate 12' and the second plate 20' may be manufactured from different materials, the plates 12' and 20' may be compatible with the precursor material layer 28' to facilitate adequate bonding of the first plate 12' and the second plate 20' to the porous membrane 30'.

In either of the above-described embodiments, the porous membrane 30 may itself be a microporous material, in which case the porous membrane 30 functions as a membrane support and a porous membrane. In other applications, the porous membrane 30 may be a mesoporous material or a macroporous material, in which case, the porous membrane 30 preferably functions as a porous membrane support. The mesoporous or macroporous porous membrane 30 may have an organic or inorganic material. "Having an organic or inorganic material" includes both the coating and/or impregnating processes, as will be described in greater detail below. In the coating, a microporous material may be coated on the meso- or macroporous material. Depending upon the application, the membrane material applied may be catalytic or non-catalytic in nature.

A non-catalytic microporous material, for example, may be applied to a meso- or macroporous material in order to lend a greater separation function to the membrane 30. By way of additional example, the coating on the membrane 30 may have one or more moeities introduced therein to change the functionality of the membrane 30. For example, the membrane 30 may undergo a silanization process that changes the wetting properties of the membrane 30. Silanization of the membrane 30 can result in hydrophilic, hydrophobic or organophobic functionalization of the membrane 30.

An example method of hydrophobic functionalization can be accomplished in the following manner. Approximately 3 grams (g) of dimethyldichlorosilane is mixed with approximately 15 ml of 12 molar (M) hydrochloric acid (HCl) and approximately 85 ml of ethanol. The channels on both sides of the membranes are filled with dimethyldichlorosilane/HCl/ethanol solution. After about 1 hour at room temperature, the channels may be flushed, and the microstructure 10 is dried at approximately 80° C. for about 2 hours.

Organophobic functionalization of the membrane 30 can be accomplished by the following exemplary method. The channels on both sides of the membrane 30 are filled with a fluorosurfactant solution. An exemplary fluorosurfactant that may be used is Fluorad™, manufactured by and commercially available from 3M™ of Saint Paul, Minn., USA. After about 1 hour at room temperature, the channels are flushed and the microstructure 10 is dried at about 80° C. for approximately 2 hours.

A mesoporous membrane can also be "functionalized," for example, by impregnating it with a coating or material that fills the pores of the mesoporous membrane and renders it, in effect, a microporous membrane. In order to render the microporous membrane material useful for some commercial applications, functional composites with small effective thicknesses (in the micron or submicron range) can be used. Modification of mesoporous membranes to form microporous membranes may be accomplished by sol-gel and chemical vapor deposition (CVD) techniques, carbonization of polymers to form molecular-sieve carbon, and/or polycrystalline-film growth of zeolites and other molecular sieves. Using these methods, fluxes as high as 0.1 mol/($m^2$s) may be achieved.

Exemplary embodiments of the operation of the membrane microstructure 10, 10' is described below with reference to FIGS. 3-6. While reference is made to the membrane microstructure 10 depicted in FIGS. 1A-1C, the operations described below, and thus the function of the porous membrane 30, are equally operative with the membrane microstructure 10' of FIGS. 2A-2C.

FIG. 3 depicts the membrane microstructure 10 performing a separator function. Generally speaking, after a reaction has occurred, reaction products (A+B) enter microchannels 32 through an inlet port 38. The porous membrane 30 in one example is configured such that reaction product B permeates through the porous membrane 30 into microchannels 34 where it is carried out of the membrane microstructure 10 via the outlet port 40. Reaction product A, however, continues to pass through the microchannels 32 until it exits the outlet port 42. As a result, the yield of A is increased as compared to a conventional microreactor, and/or A is separated from B.

Figure 4:
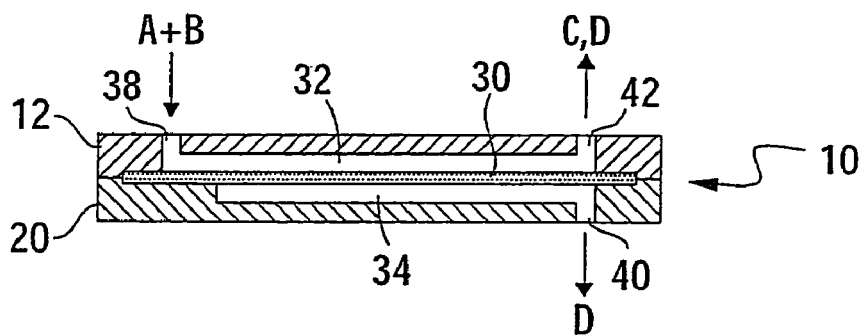
FIG. 4 depicts the membrane microstructure depicted in FIG. 1C functioning as an extractor.

FIG. 4 depicts an alternative extractor embodiment of the membrane microstructure 10. In accordance with the embodiment depicted in FIG. 4, reactants A and B are urged into microchannels 32 through the inlet port 38, in one example via a pressure differential created within the membrane microstructure 10. A and B react or are caused to react within microchannels 32 of the membrane microstructure 10 resulting in reaction products C and D. The characteristics of the porous membrane 30 enable reaction product D to pass through the porous membrane 30 into microchannels 34 and out the outlet port 40, while those same characteristics of the porous membrane 30 prevent reaction product C from passing through the porous membrane 30. Accordingly, reaction product C continues through microchannels 32 and is thereafter passed through the outlet port 42. The reaction and subsequent separation provided by this embodiment of the membrane microstructure 10 may be increased, for example, by coating or impregnating the porous membrane 30 with a catalyst. If it is preferable to produce more reaction product C than D, then the yield of C can be increased by the removal of D during the reaction. For example, the yield of C can be increased from about 30% to about 70% over what is being implemented in tubular reactors.

Figure 5:
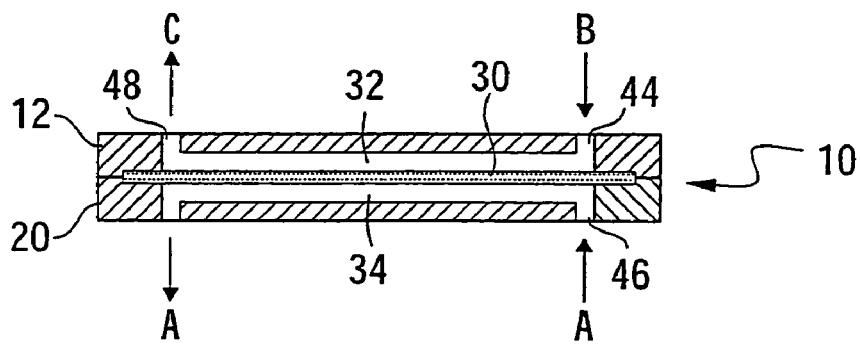
FIG. 5 depicts the membrane microstructure depicted in FIG. 1C functioning as a diffuser.

FIG. 5 depicts the membrane microstructure 10 functioning as a distributor or diffuser. As indicated in the drawing figure, a first reactant B is introduced into the microchannel 32 through an inlet port 44, and a second reactant A is introduced into the microchannel 34 through an inlet port 46. As reactant B traverses the microchannel 32, reactant A permeates through the porous membrane 30 and enters the microchannel 32 where reactant A reacts with reactant B. The regulated reactant concentration by permeation through the membrane, among other things, improves selectivity and results in a reactant product C that may exit the microchannel 32 through the outlet port 48. Reactant A may be recycled through the microchannel 34. An example of such a reaction may be hydrogenation of a molecule with hydrogen gas.

Figure 6:
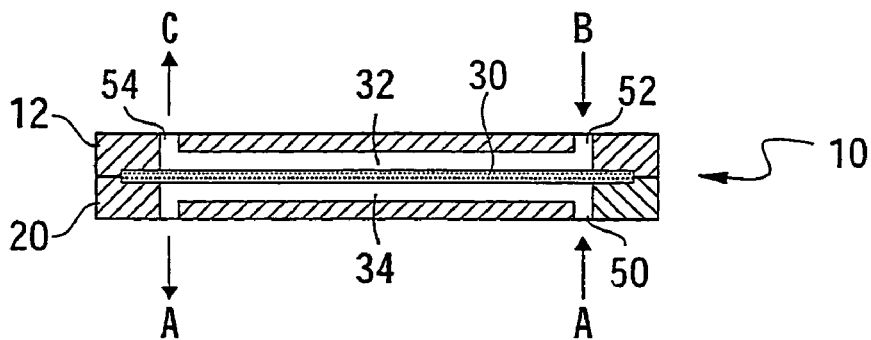
FIG. 6 depicts the membrane microstructure depicted in FIG. 1C functioning as a contactor.

FIG. 6 depicts the membrane microstructure 10 functioning as a contactor. In the contactor application of the microstructure 10, the porous membrane 30 may or may not include a catalyst. In an embodiment where porous membrane serves as a support for a catalyst, it is possible to feed the porous membrane 30 with reactants from both sides (for instance gas from one side, liquid from the other) or to force a reactive mixture through the active wall. In the embodiment shown, reactant A is introduced into the microchannel 34 through the inlet port 50, while reactant B is introduced into the microchannel 32 through the inlet port 52. Given the arrangement of the porous membrane 30 between the microchannel 32 and the microchannel 34, and because both the upper and lower surfaces of the porous membrane 30 may be coated or otherwise impregnated with an operative catalyst, reactants A and B do not compete for interaction with the catalyst. As a result, reactants A and B react together within the porous membrane 30 and a reactant product C is dispensed from the outlet port 54. The arrangement depicted in FIG. 6 avoids mass transfer limitations improving reaction selectivity and thus optimizes the reaction. As in FIG. 5, reactant A may be recycled through the microchannel 34.

Alternatively, and although not shown in the drawing figures, the membrane microstructure 10 depicted in the FIG. 6 may also be configured to include an outlet port in the second plate 20. In such an embodiment, reactant A may be introduced into the microchannel 34 in solution in order to facilitate, for example, a nitration reaction. While reactant A may permeate through the porous membrane 30 to react with reactant B, the remainder of the solution would be prohibited from entering the microchannel 32, and instead, would be caused to exit the outlet port in the second plate 20.

Although the plate 12, 12' used to form the membrane microstructure 10, 10' may be made a number of different ways, one method includes forming, under a vacuum (to avoid trapping any bubbles of gas), desired microstructure shapes from a first mixture of an organic medium and a material that is a precursor for glass, glass-ceramic, ceramic, or a combination thereof, on a first substrate made of a material selected from glass, glass-ceramics, ceramics, metals, semiconductors such as silicon or combinations thereof. In accordance with this "vacuum-assisted micromolding process," the precursor material concerned may be compatible in terms of thermal expansion coefficient with the material constituting the first substrate. The vacuum-forming can be implemented under conditions which confer at least a minimum amount of mechanical strength to the shapes generated.

The formed mixture may be presintered by applying appropriate heat treatment to the assembly including the first substrate and the formed mixture (the presintering serves to eliminate the organic medium and to consolidate the structure). A precursor material layer 28, 28', for example a glass, ceramic or glass-ceramic frit, may be applied atop the molded shapes, the precursor material being compatible in terms of thermal expansion coefficient with substantially all of the precursor materials with which it may come into contact. The precursor material may be applied across the entire surface of the plate or across a central portion of the plate, depending upon the embodiment being made.

A second plate 20, 20' may be manufactured in accordance with the method described above for the plate 12, 12'. Although not required, the precursor material layer 28, 28' may be applied across the entire surface of the plate 20, 20' or across a central portion thereof. The first plate 12, 12' and second plate 20, 20' may then be assembled together such that the precursor material layers face each other and such that the recesses defined between the molded shapes are substantially aligned on opposite sides of the precursor material layer. The resulting assembly may be heat treated (fired) so as to bond together the precursor material and the plates.

Generally speaking, the vacuum-forming may be implemented in various different ways, in particular taking account of the nature of the organic medium mixed in the precursor material. The organic medium in the mixture can be constituted, in particular, by a thermoplastic medium, a thermosetting medium, or a photopolymerizable medium.

In addition, the method may be initiated in one or more of the following ways. The first mixture may be placed on the first substrate prior to application of the mold in the forming operation (e.g., in a vacuum enclosure) or the mold may initially be placed on the first substrate, a vacuum established, and then the mixture injected therein. If a thermoplastic medium is used in the mixture, then the mixture may be heated, shaped with an appropriate mold, and allowed to cool, after which the mold may be removed. If the medium is a thermosetting medium, then the mixture may be formed at ambient temperature with an appropriate mold, heated (once it has been formed), cooled, and the mold may be removed. If the medium is a photopolymerizable medium, then the mixture may be formed at ambient temperature with an appropriate mold. Once it has been formed, it may be exposed to appropriate radiation (e.g., UV-light, X-rays), after which the mold may be removed. Molds used may be prepared and adapted to the desired final shape from suitable master molds.

Vacuum-forming may generate shapes in relief in the mixture of the precursor medium and organic material. In characteristic manner, the shapes are obtained by deforming the mixture while it is supported on a substrate. The substrate is preferably not subjected to any etching.

Since the presintering may be performed on a structure that is supported, it is simple to perform and the structure retains its planarity. Presintering serves to eliminate a major portion of the organic components from the mixture prior to assembly (prior to closing the structure). Eliminating volatile components from a complex three-dimensional structure may be difficult, since the gases must be able to escape without damaging the structure. The use of substrates made of glass, glass ceramic, ceramic, metal, or semiconductor is particularly advantageous in that sub-structures can be formed easily without the need to produce and handle such sub-structures in a self-supporting configuration that is fragile. The structures do not sag or become distorted, thus making it possible to provide channel walls that are far apart and/or wall shapes that are complex. It is easy to introduce additional parts such as electrical conductors, electrodes, or light conductors on the substrates with the mechanical behavior of the parts being minimally affected, and in many cases, substantially or completely unaffected.

Presintering is generally implemented after a material has been applied to the formed mixture. The applied material is inert relative to the precursor material and absorbs the organic medium. Application of the inert absorbent material minimizes the extent to which the formed mixture may sag or collapse. The absorbent material is generally powdered or sprayed onto the formed mixture for presintering.

When operations are not repeated, the disclosed method makes it possible to provide a unitary membrane microstructure by assembling together first and second plates. One of the plates then acts as a bottom plate while the other acts as a top plate. When operations are repeated, the method makes it possible to provide a stacked membrane microstructure including n membrane microstructures, having one or more common plates. The one or n membrane microstructures may be secured to one another by using a joining material or during the membrane fabrication process (e.g., during firing/sintering). Multiple membrane microstructures may be stacked or otherwise arranged in a vertical position, in a horizontal position, in an inclined position, or in some other orientation known in the art.

In addition to the steps described above, the disclosed method can include additional steps. Passages may be provided by drilling, for example, to allow fluid circulation, to allow such fluids to enter and leave, and to allow fluids to pass from a channel in one element to a channel in another element. Drilling operations may also be performed on parts that are to be assembled together, advantageously through the presintered mixtures. In addition, one or more additional parts can be inserted. In particular, inserted parts may be of the type specified above (e.g., electrical conductors, electrodes, light conductors, to name a few) on one of the substrates involved and/or in the precursor mixture involved, or in an intermediate layer that is inserted between at least one of the first and second substrates and the corresponding first or second mixture. During manufacture of each of the elements of the microstructure devices, it is entirely possible to slide at least one intermediate layer (e.g., a fine layer of silicon (Si), a layer of glass, of ceramic, or glass ceramic) between a substrate and the precursor mixture for generating a portion of the membrane microstructure. For example, electrodes can be formed by conventional printing, photolithography, or electroforming techniques.

Figure 7:
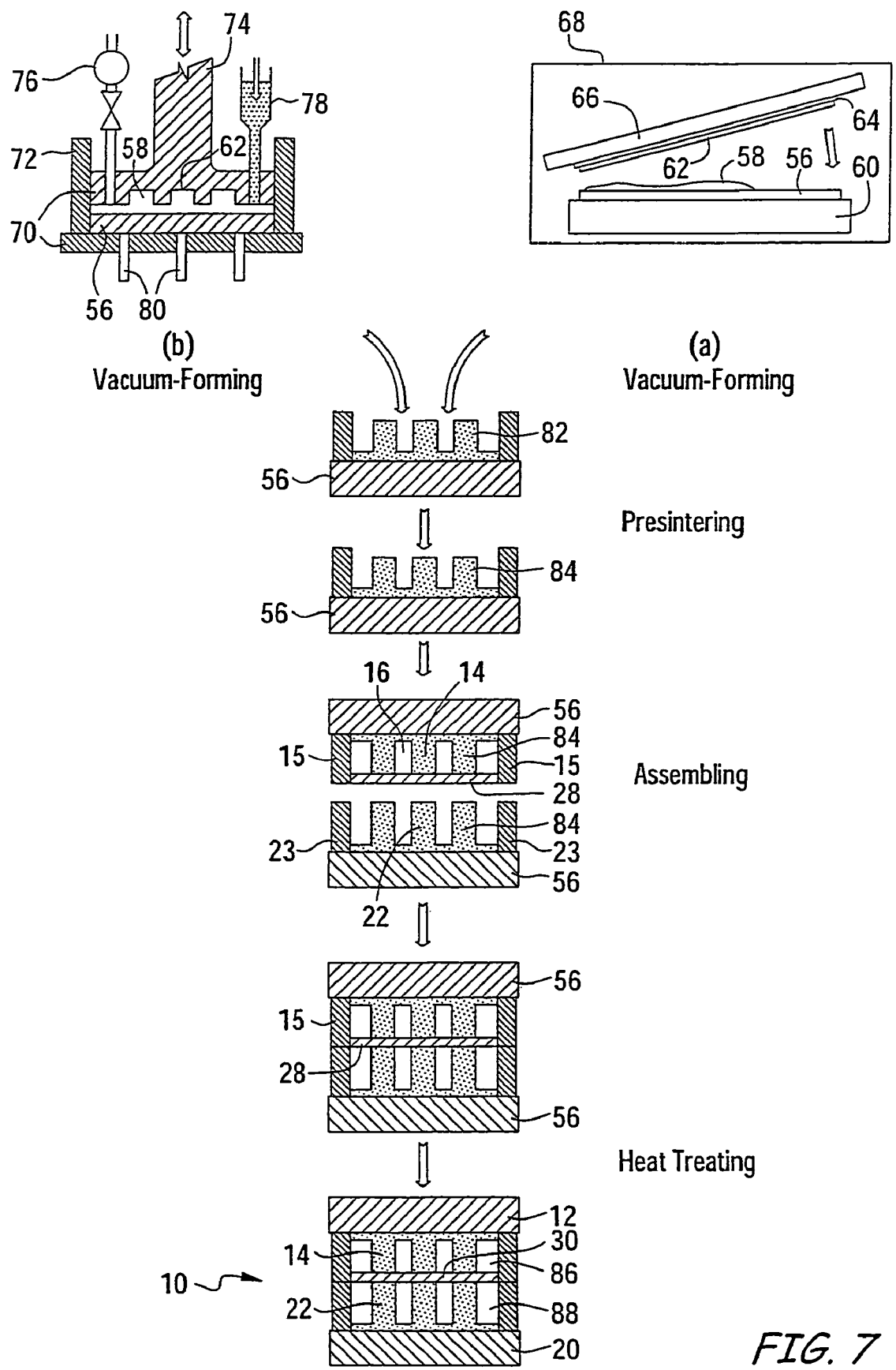
FIG. 7 schematically illustrates exemplary methods of manufacturing the membrane microstructure depicted in FIGS. 1A-1C.

One exemplary method of manufacturing the membrane microstructure 10 is depicted in FIG. 7. Initially, and in one embodiment, a microstructure in relief is made on a substrate 56 (e.g., of glass or of Si). The microstructure is made by molding, for example, a mixture 58 including glass frit and a thermoplastic medium. Two different techniques are shown diagrammatically. The technique shown in (a) in the upper right corner of FIG. 7 is similar to the technique described in U.S. Pat. No. 5,853,446, and more particularly to the method described in Example 4 of that patent, the disclosure of which is hereby incorporated herein by reference. In accordance with the method, the mixture 58 is deposited on the substrate 56. Substrate 56 carrying the mixture 58 is placed on a thermostatically controlled support 60. A suitable mold 62, preferably made of elastomer is prepared in advance. The mold 62 is positioned on a support 64, which is itself secured to a heater element 66. The assembly, including the elements 66, 64, and 62, is degassed in a vacuum inside the enclosure 68 prior to the mold 62 being applied to the mixture 58 in the enclosure. Such degassing of the mixture 58 substantially or completely prevents bubbles of gas from being trapped in the formed mixture.

The method shown in (b) in the upper left corner of FIG. 7 is based on injecting the mixture 58 into the mold 62 after it has been placed in advance on the substrate 56. The assembly including the substrate 56 and the mold 62 is positioned between two hot plates 70 inside a jacket 72 suitable for opening and closing under the action of a piston 74. After the inside of the mold 62 has been evacuated by an evacuation mechanism 76, the mixture 58 is injected through an injector 78. At the end of the thermoforming process, the thermoformed assembly is ejected using an ejector mechanism 80 acting through the bottom hot plate.

After the vacuum-forming step has been implemented, a mixture 82 is obtained that is secured to the substrate 56, which mixture includes the mixture 58 that has been thermoformed. The assembly is then subjected to heat treatment so that the mixture 82 is presintered. The mixture is then referenced 84, which mixture includes mainly heat-treated glass frit.

In parallel, a second plate may be prepared for the membrane microstructure 10. The second plate may be of the same type as the first plate. It includes a substrate 56 having a presintered thermoformed mixture 84 secured thereto.

In accordance with one embodiment, a precursor material layer 28, preferably a glass, glass-ceramic, or ceramic frit is deposited along the thermoformed mixture 84 of each plate. The thermoformed mixture 84 of each plate preferably defines a plurality of microchannel walls 14 and 22. In accordance with one embodiment, the precursor material layer 28 is preferably substantially evenly spread across the top surfaces of the walls 14 to cover each of the recesses 16 defined by the thermoformed mixture 84. As shown in the drawing figure, the outer walls 15 of the first plate preferably extend further from the substrate 56 than the interior walls. Thus, in the embodiment shown, the precursor material layer 28 is spread substantially evenly between the outer walls 15 of the first plate such that the precursor material layer 28 is substantially co-planer with the top of the outer walls 15.

The first and second plate are somewhat, substantially, or completely aligned such that the precursor material layer 28 of the first plate faces the thermoformed mixture 84 of the second plate. The first and second plates are then brought into engagement with one another such that the walls are substantially aligned and the resulting assembly is thereafter subjected to heat treatment under suitable conditions to generate a membrane microstructure 10. The sealed membrane microstructure 10 so arranged defines a first plurality of microchannels 86 above the porous membrane 30 resulting from the heat treatment, and a second plurality of microchannels 88 beneath the porous membrane 30. Microchannels 86 and 88 may be substantially aligned with one another and separated by the porous membrane 30. Although physically separated by the porous membrane 30, the porous membrane 30 provides selective fluid communication between the microchannels 86 and 88.

Further details relating to the methods of manufacturing the disclosed microfluidic reactor may be found in co-pending U.S. Pat. No. 6,595,232.

Alternatively, the glass plates 12, 12' used to manufacture the disclosed membrane microstructure 10 may also be manufactured by a wet etching process.

For certain embodiments, and in particular when desired for the given application, the porous membrane 30 may be coated with a catalytic or non-catalytic coating. Such a coating may be bonded to and supported by the porous membrane 30 on both the upper and lower surfaces of the porous membrane 30. Typically, the coating reduces the size of the pores defined within the porous membrane 30. The coating may include an inorganic catalyst support that may be adhered to and within the pores of the porous membrane 30, and which may be disposed on at least the interior surfaces defining the microchannel(s) of the microchannel walls of the membrane microstructure 10, 10'. For the purpose of the present description, coated membrane microstructures and coated membrane microreactors are both characterized as integral structures defining internal void spaces (e.g., microchannels, cavities or the like) bounded by internal surfaces (or microchannel walls) and within which a reactant stream entering the microstructure or microreactor for treatment comes into contact with catalytically active species in the coating layer(s) disposed on the porous membrane 30 and microchannel walls 14, 14' and 22, 22'. Coated microstructures and coated microreactors are not intended to include monolithic extruded ceramic honeycomb structures used within catalytic converters in the automobile industry. Such structures are stand alone devices having parallel channels. The catalyst support, which is generally of oxide composition, will preferably have a predetermined porosity. The microstructure or microreactor, including the microchannel walls, may be made of, for example, glass, glass-ceramic and/or ceramic composition. The microchannel walls may be solid structures or may be themselves porous structures, such as porous membranes.

In the case of one example membrane microstructure, the catalyst support may be coated on the channel walls and the porous membrane 30 as a porous inorganic catalyst support layer. That layer may (i) occupy at least approximately 1% of the surface of the microchannel cross section when the cross section is taken perpendicular to the fluid flow path, (ii) provide an open and interconnected porosity of at least 5%, more preferably at least 30%; , and (iii) be characterized by a mean pore size in the range from about $0.2-10^4$ nanometers (nm). For certain microreactor microchannels, the layer thickness may be between about 10 microns ($\mu$m) and about 200 $\mu$m. Disposed on or within the pore structure of this catalyst support may be a metal, metal oxide or other catalytically active species having activity and selectivity for the particular reaction for which the coated microreactor is to be used. In some applications the catalyst support and the catalyst may be inorganic. In other applications, the coating(s) may be non-catalytic.

The invention further includes a method for making a coated membrane microstructure, as described above. In accordance with one exemplary method, a slurry is passed into the membrane microstructure incorporating one or more internal voids or microchannels defined by microchannel walls made of glass, glass-ceramic, and/or ceramic materials. The slurry may be directed into the microchannels under pressure through inlets on both sides of the membrane microstructure such that the slurry completely fills the microchannels, both above and below the porous membrane. The slurry may include a catalyst support and a catalyst, in which case the coating may be applied to the microchannel walls and the porous membrane in a single step. In another embodiment, the slurry may only include the catalyst support. In such an embodiment, the catalyst may be deposited on or through the catalyst support in a second process step utilizing a catalyst impregnation technique as will be described in greater detail below.

The slurry preferably includes a liquid phase that constitutes or contains a precursor for a permanent inorganic binder for the oxide catalyst support. The inorganic binder, typically a metal oxide binder, is selected for its effectiveness in forming an adherent coating of the desired internal pore structure. The composition of the binder may be the same as or different from the composition of the catalyst support, and its precursor will generally be an organometallic or inorganic compound of a metal that is soluble or highly dispersible in the liquid phase of the slurry.

After the microchannels have been filled with the slurry, a portion of the slurry is removed from the microchannel such that a slurry layer coats the plurality of microchannel walls and preferably both sides of the porous membrane. Typically, the slurry is allowed to drain from an outlet in the microreactor using, for example, forced air circulation, vacuum aspiration, or some other fluid that is nonmiscible with the slurry. The membrane microstructure and its included slurry layer may then preferably be dried and heated to a temperature at least sufficient to remove the liquid phase from the slurry to form a coating layer. Further heating to cure or partially sinter this layer is preferably undertaken immediately after the removal of the liquid, but may alternatively be deferred until after deposition of additional layers. Thus, following removal of the liquid phase from the coating layer, the steps of filling the microchannels with a slurry, removing at least a portion of the slurry from the microchannel, drying and heating to remove the liquid phase can be repeated to form one or more additional coating layers on the initial coating layer.

This process may be repeated until the combination of the first coating layer and any additional coating layers reaches a thickness that will provide the appropriate reaction kinetics for a given catalytic reaction. Final heating to cure the last and any underlying uncured layers may then be carried out.

Providing a catalytically active species on or within at least one, or more preferably all, of the coating layers may be carried out either during the slurry deposition, after each coating layer has been deposited, or after all coating layers have been deposited. Moreover, catalyst impregnation may occur either before or after curing.

The process thus offers the option of a completely homogenous distribution of catalyst throughout the entire thickness of the coating, or alternatively a layered coating wherein the layers may not only contain different catalytic species, but may also differ from adjacent layers as to thickness, porosity, or both. Several steps that may optionally be followed to vary the composition, pore morphology, or other properties of the catalyst support for the purpose of adapting the coating to specific applications. For example, catalysts or other additives may be included in the slurry composition, or instead deposited on the powdered oxide catalyst support added to the slurry. The latter procedure is particularly effective to ensure a wide distribution of catalyst throughout the thickness of the catalyst support layer after curing.

Also useful as optional slurry constituents are pore-forming additives that may be used to modify the pore structure of the layers through subsequent thermal or chemical treatment thereof. Constituents that promote gelling of the deposited layers prior to drying may also be included in the slurry as a means to increase deposited layer thickness, modify the final coating porosity, or control the geometrical shape of the deposited layers.

The composition of the particular catalytically active species that may be impregnated within the coating layer is not critical, but may be determined in accordance with conventional practice, e.g., in view of the particular application or process environment within which the coating layer is to be utilized. Conventional catalysts that may be advantageously employed include at least the precious metal catalysts of group VIII A of the Periodic Table of Elements, as well as the transition metals of groups IV A, V A, VI A, VII A and VIII A thereof. Acceptable catalyst supports for the coating layers include, but are not limited to, alumina, and in particular, gamma alumina, boehmites of fine particle size, silica, alumina silica and molecular sieves such as, but not limited to, zeolites, titania and/or zirconia.

Further details relating to methods of manufacturing a coated microstructure may be found in a simultaneously-filed application serial number EP03293327.7, (Applicant's/Agent's reference SP03-182), which is entirely incorporated herein by reference.

Figure 8:
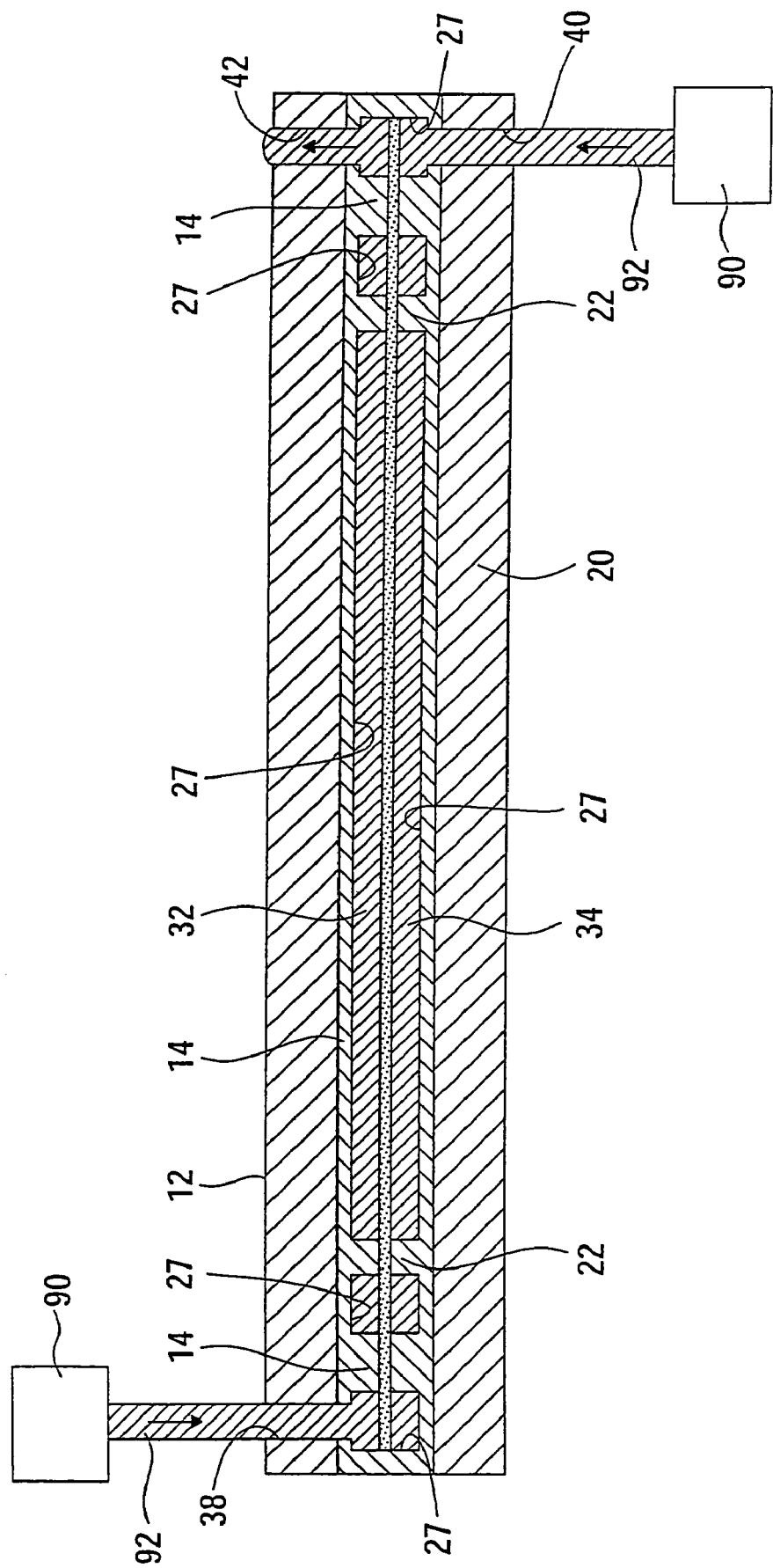
FIGS. 8-10 schematically depict an exemplary method of coating the porous membrane with a catalyst.

A method of manufacturing a coated membrane microstructure 10 will now be described with reference to FIGS. 8-10. As shown in FIG. 8, a source 90, such as, but not limited to, a syringe, for delivering a slurry 92 under pressure cooperates with the inlet port 38 and the outlet port 40 to deliver the slurry 92 through the inlet port 38 and outlet port 40 and into microchannels 32 and 34. In one embodiment, the slurry 92 is delivered into the microchannels 32 and 34 until the microchannels 32 and 34 are completely full and the slurry 92 exits the outlet 42. As mentioned above, at this point, the slurry 92 includes a catalyst support and may or may not include a catalyst. For the purpose of this discussion, it will be assumed that the slurry 92 includes both a catalyst support and a catalyst.

Figure 9:
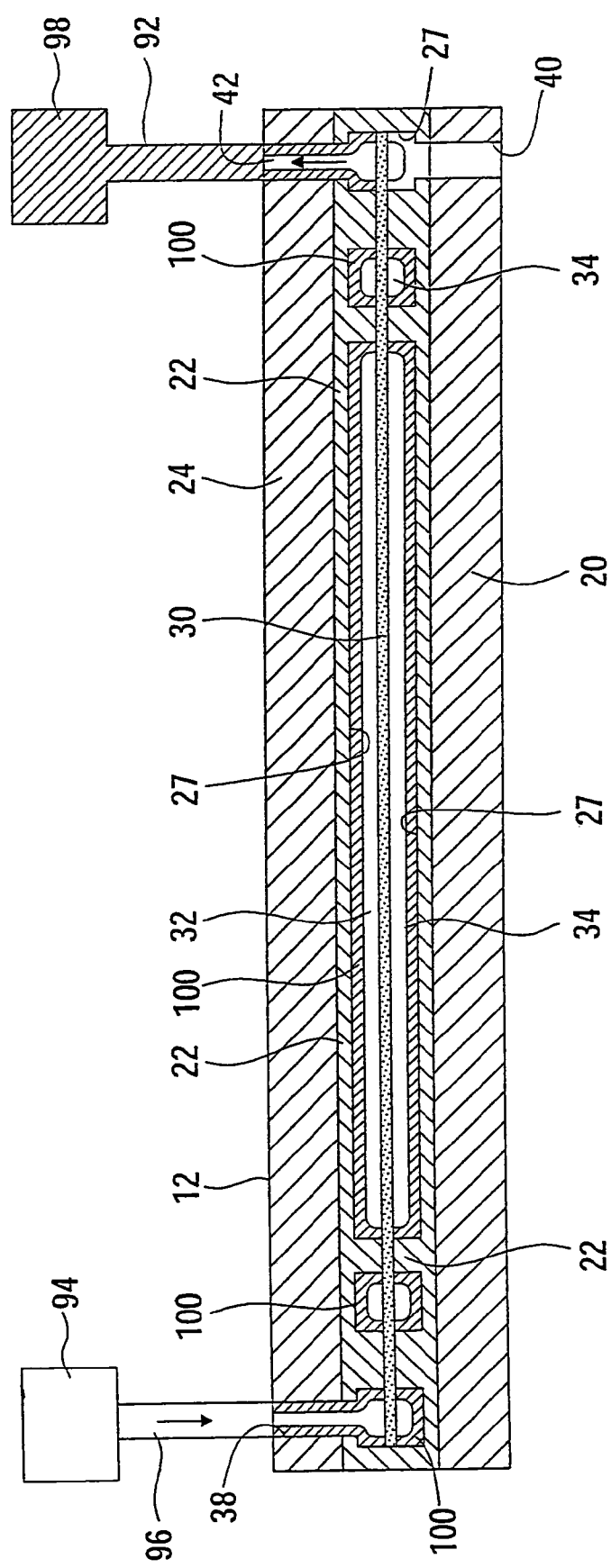
Figure 10:
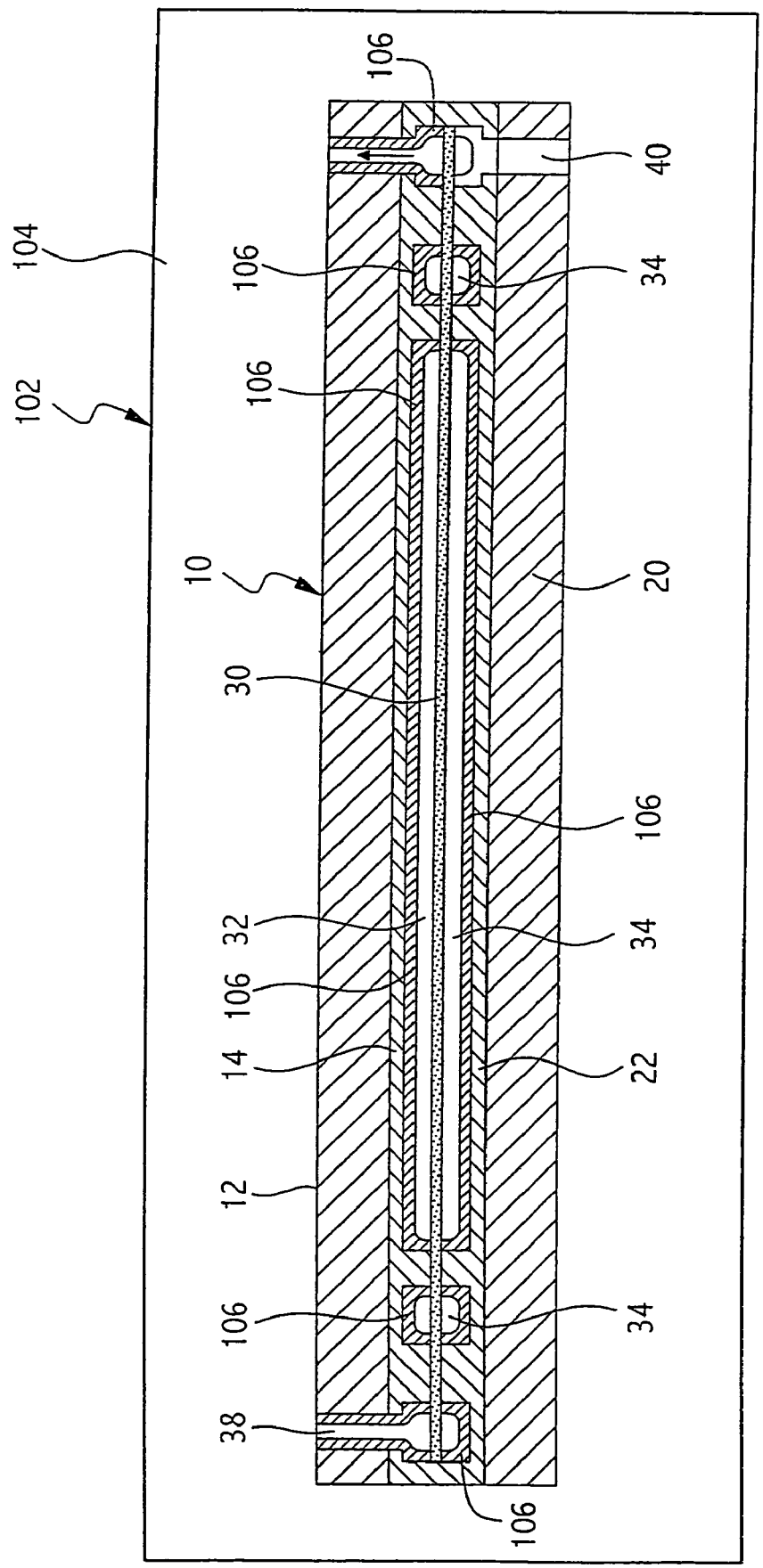

Once microchannels 32 and 34 have been filled with the slurry 92 such that the slurry 92 covers all of the microchannel wall surfaces 14 and 22 defining the microchannel 32 and 34, respectively, at least a portion of the slurry 92 is drained or otherwise removed from the microchannels 32 and 34 as shown in FIG. 9. In accordance with one embodiment of the disclosed method, a source 94 of forced air 96 may preferably cooperate with the inlet port 38 to deliver forced air 96 through the microchannel 32 and out the outlet port 42. As forced air 96 travels through the microchannel 32, a substantial portion of the slurry 92 is forced through the outlet port 42 and into a collection vessel 98 cooperating with the outlet port 42. Vacuum aspiration (not shown) may be applied to the microchannel 34 via the outlet port 40 to achieve the substantially same result for the microchannel 34. As shown in FIG. 9, a slurry layer 100 remains affixed to all of the microchannel walls 14 and 22 and the surfaces of the porous membrane 30 at the completion of this process.

The slurry layer 100 is permitted to dry, preferably while exposed to an air flow having a low flow rate, for a period of time sufficient to remove most of the liquid phase from the slurry layer. As shown in FIG. 10, the membrane microstructure 10 coated with the slurry layer 100 is positioned within a heat source 102 and is heated to a temperature sufficient to cure and bind the slurry layer 100 to the microchannel walls 14 and 22 and the porous membrane 30. Generally speaking, the membrane microstructure 10 coated with the slurry layer 100 may be heated in the presence of an inert gas 104. Following heating, the coated membrane microstructure 10 includes a solid coating layer including both a catalyst support and a catalyst well dispersed throughout the thickness of the coating layer 106. In one embodiment, the coating layer 106 covers all of the internal wall surfaces and the porous membrane surfaces facing the microchannels within the membrane microstructure 10.

The above-described process may be repeated numerous times to apply additional slurry layers 100 atop of preceding slurry layers 100, resulting in a number of solid coating layers 106. In addition, the coating layer 106 may be applied in a two-step process (not shown). In accordance with such a process, the slurry 92 does not include a catalyst. A catalyst support containing slurry is delivered, removed, dried, and heated in accordance with the steps described above, and thereafter, a solution containing a desired catalyst is delivered into the slurry coated microchannels 32 and 34, either before or after heating in order to impregnate the catalyst containing slurry layer, or catalyst containing coating (if after firing), with the catalyst.

A specific method of forming a glass thin porous layer (e.g., a realized 200 μm thickness) includes blading and drying methods used with an aqueous medium and hydro-soluble polymer. For example, using a hot magnetic plate, approximately 30 g of hydroxyethyl cellulose (HEC) is mixed with approximately 600 g of hot dionized (DI) water at a temperature of about 60° C. in a beaker. The pH may be adjusted with a sodium hydroxide (NaOH) to a pH of approximately 8-9. Glass powder, with a particle size less than or equal to about 20 μm is added to the mixture and left overnight. An ultrasonic device may also be used to remove any resultant bubbles. The mixture is then poured into a container and put on an oscillating rotating mixer for at least about 24 hours. The membrane may be obtained by blading the mixture onto a leveled MYLAR™ sheet and left to dry. After approximately 24 hours, the membrane may be peeled from the sheet with caution. Using scissors, the membrane may be cut to the correct dimensions and be placed between two flat glass ceramic supports, followed by heating to approximately 590° C. The membrane is stacked between two glass plates having glass microstructures in relief and the final assembly is baked at 620° C. With this specific process, the amount and intensity of mixing, percentage of polymer concentration, and particle size may all be varied to achieve a membrane useful for the desired application.

While the disclosed microstructures and methods have been described in detail, it is to be expressly understood that it will be apparent to persons skilled in the relevant art that they may be modified without departing from the spirit or scope of the invention. Various changes of form, design, or arrangement may be made to the microstructure without departing from the spirit and scope of the invention. Therefore, the above mentioned description is to be considered exemplary, rather than limiting, and the true scope of the invention is defined in the following claims.

Any discussion of the background to the invention herein is included to explain the context of the invention. Where any document or information is referred to as "known", it is admitted only that it was known to at least one member of the public somewhere prior to the date of this application. Unless the content of the reference otherwise clearly indicates, no admission is made that such knowledge was available to the public or to experts in the art to which the invention relates in any particular country (whether a member-state of the PCT or not), nor that it was known or disclosed before the invention was made or prior to any claimed date. Further, no admission is made that any document or information forms part of the common general knowledge of the art either on a world-wide basis or in any country and it is not believed that any of it does so.

The invention claimed is:

1. A unitary microstructure comprising:
   a first plate comprising a first plurality of walls defining a first recess;
   a second plate comprising a second plurality of walls defining a second recess; and
   a glass, ceramic, or glass-ceramic porous membrane disposed between the first and second plates, wherein the first plate, second plate and porous membrane are sandwiched together and joined by firing/sintering such that the porous membrane cooperates with the first and second plurality of walls to define a first microchannel and a second microchannel in fluid communication with the first microchannel, wherein the first plate and the second plate comprise a material chosen from at least one of glass, ceramic, and glass-ceramic.

2. The unitary microstructure of claim 1 wherein the membrane comprises a mesoporous or macroporous support structure.

3. The unitary microstructure claim 2 wherein the macroprous or mesoporous support structure supports a catalytic or non-catalytic material.

4. The unitary microstructure of claim 3 wherein the catalytic or non-catalytic material is microporous.

5. The unitary microstructure claim 2 wherein the macroporous or mesoporous support structure supports a microporous catalytic material.

6. The unitary microstructure of claim 1 wherein the first plate and second plate are joined to one another at a plate interface such that the porous membrane is encapsulated within the integral microstructure.

7. The unitary microstructure of claim 6 wherein the porous membrane extends across the central portion of the integral microstructure such that the first plate and the second plate are not in contact with one another.

8. The unitary microstructure of claim 1 further comprising, in fluid communication with the membrane, a component chosen from at least one of a micromixer, a heat exchanger, a separator, a flow controller, a sensing unit, and analyzing chamber, and a monitoring chamber.

9. The unitary microstructure of claim 1 wherein the first microchannel, second microchannel, and porous membrane are coated with a microporous material.

10. The unitary microstructure of claim 9 wherein the microporous material comprises a catalyst.

11. A method of manufacturing a microstructure as recited in claim 1 comprising the steps of:
 disposing a precursor material atop a first plate comprising a first plurality of walls defining a first recess;
 assembling the first plate with a second plate comprising a second plurality of walls defining a second recess such that the precursor material is positioned between the first and second plates and covers at least a portion of the first and second recesses; and
 heating the assembled first and second plates to a temperature sufficient to transform the precursor material into a glass, ceramic or glass-ceramic porous membrane joined to the first and second plates.

12. The method of claim 11 further comprising the step of manufacturing a glass, ceramic or glass-ceramic first late and second plate via a vacuum-assisted micromolding process.

13. The method of claim 11 wherein the step of assembling further comprises abutting the first plate with the second plate at a plate interface surrounding the precursor material.

* * * * *